United States Patent [19]

Whiteley

[11] Patent Number: 4,949,945
[45] Date of Patent: Aug. 21, 1990

[54] VISE SWIVEL MOUNT

[76] Inventor: Durwood J. Whiteley, Rd 1, Box 290, Forksville, Pa. 18616

[21] Appl. No.: 308,267

[22] Filed: Feb. 9, 1989

[51] Int. Cl.$^5$ .............................................. B23Q 1/04
[52] U.S. Cl. ....................................... 269/71; 269/57; 269/95
[58] Field of Search ....................... 269/45, 71, 57, 69, 269/76, 95

[56] References Cited

U.S. PATENT DOCUMENTS

| | | |
|---|---|---|
| 979,305 | 12/1910 | Hunt . |
| 1,396,192 | 11/1921 | Goddu et al. . |
| 1,662,152 | 3/1928 | Logg . |
| 1,670,194 | 5/1928 | Fontaine ................................. 269/71 |
| 1,818,501 | 8/1931 | Odin . |
| 1,903,163 | 3/1933 | Botsford . |
| 2,106,525 | 1/1938 | Henry ..................................... 269/71 |
| 2,480,885 | 9/1949 | Sedlock .................................... 77/63 |
| 2,510,198 | 6/1950 | Tesmer ................................. 248/226 |
| 2,827,690 | 3/1958 | Brown ..................................... 269/71 |
| 3,495,795 | 2/1970 | Brown ..................................... 269/71 |
| 3,550,976 | 12/1970 | Rauser, Sr. et al. ................... 269/74 |

Primary Examiner—J. J. Hartman
Attorney, Agent, or Firm—Eckert Seamans Cherin & Mellott

[57] ABSTRACT

A vise swivel mount is disclosed for use in a vehicle which includes a swivel socket bolting directly to the bed of the vehicle. A swivel column rotatively secures within the swivel socket and carries a horizontal vise support arm and vise support plate in spaced relationship over the vehicle bed. A telescoping support column extends from the bottom of the vise support plate to the vehicle bed and is vertically adjustable to support the vise in a desired vertical elevation. A spring pin is movable between the swivel socket and the swivel column to enter any one of a plurality of circular spaced openings provided in the swivel column to thereby lock the vise in any desired circularly adjusted position relative to the vehicle bed.

10 Claims, 2 Drawing Sheets

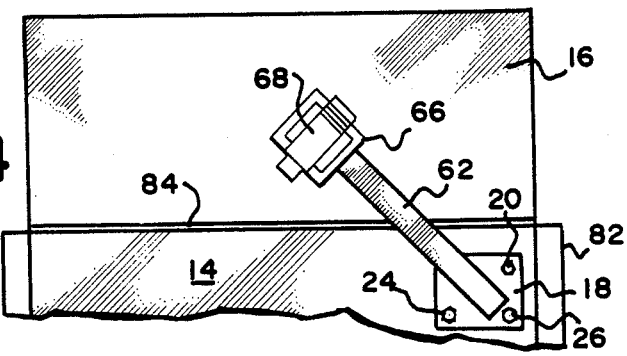
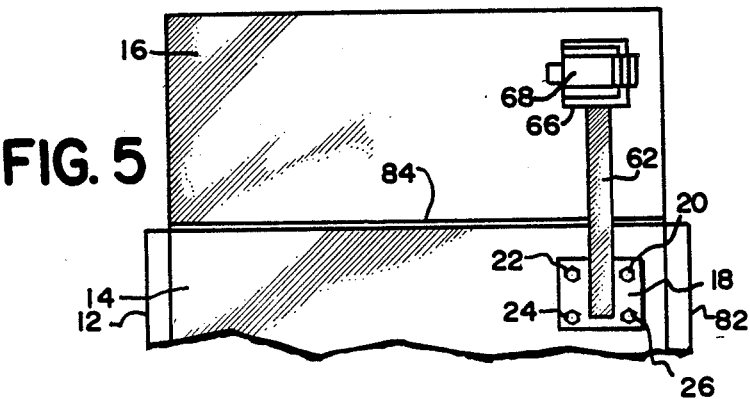
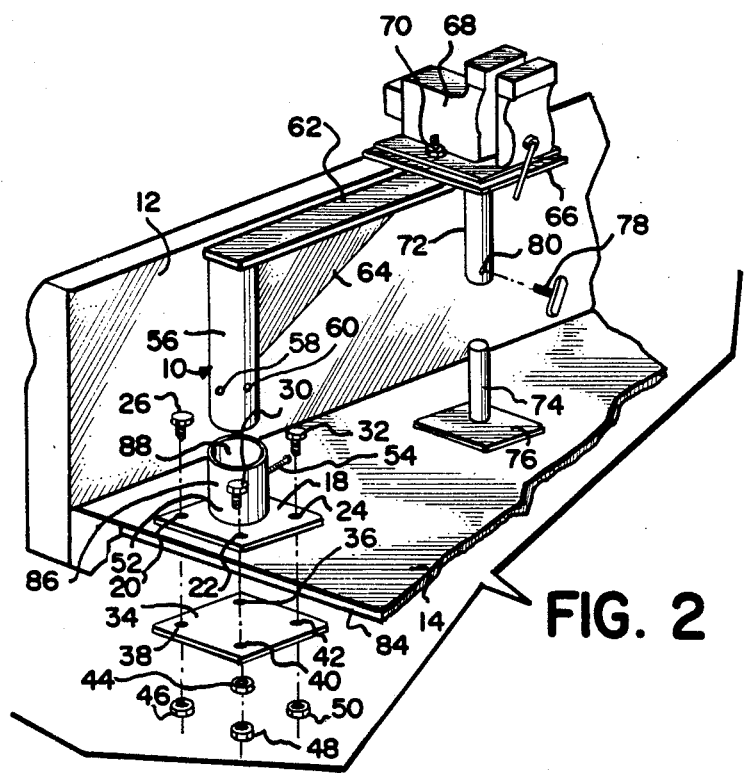

VISE SWIVEL MOUNT

BACKGROUND OF THE INVENTION

1. Field of the Invention:

The present invention relates generally to tools, and more particularly, it relates to a vise swivel mount for attachment to the bed of a truck to permit a vise to be secured and readily transported for use in a plurality of circularly adjusted positions.

2. Discussion of the Prior Art:

Tools such as vises are extremely useful in holding work pieces in a stationary, sturdy manner whereby a worker can perform various operations on the work piece as it is held firmly in the vise. While most vises are securely bolted or clamped to a workbench for use in a shop, quite frequently some workers must travel from job site to job site and must carry a vise with them for use at the various discrete locations in conjunction with the work to be performed. In such instances, it is now the common practice for the worker to simply bolt the vise directly to a sturdy portion of his vehicle so that the vise can be available when required at the various, spaced locations.

Inasmuch as such vises are normally heavy, bulky and unwieldy, by bolting the vise to a vehicle in a fixed location, the prior workers have found that it is frequently in the way and creates a nuisance when performing other aspects of the work at the job site. The vise must be accessible for use near the rear end of the vehicle so that work pieces can be easily secured and removed from the vise whenever necessary without the worker having to actually enter the vehicle to perform the desired work operations. This rearward location then will position the vise directly in the major path of ingress and egress from the vehicle, thereby interfering with other operations normally performed by the workmen. Accordingly, the need remains to provide a convenient method of transporting a vise for use at various spaced job sites in a manner whereby the vise can be readily available for work when necessary, and can be positioned out of the main flow of traffic into and out of the vehicle so as not to interfere with the normal use of the vehicle.

SUMMARY OF THE INVENTION

The present invention relates generally to tools such as vises, and more particularly, is directed to an apparatus suitable to mount a vise in a vehicle in a manner to render the vise easily available for use when necessary and which is capable of positioning the vise in a location that is away from the main path of entry into and exit from the vehicle.

A swivel mount for a vise that is suitable for direct connection to the bed of a truck, such as pick-up truck has been developed which includes a sturdy base which vertically supports an upwardly open swivel socket and which is adapted to be secured directly to the truck, such as by bolting. A swivel column is rotatable within the socket and upwardly carries a horizontal vise support arm. The vise support arm terminates outwardly in a support bed to which the portable vise can be securely bolted, clamped or otherwise affixed. Preferably, the swivel mount base is secured to the truck bed immediately adjacent to one of the truck sidewalls whereby the vise support arm and the vise can be rotated to a position that is immediately along side of the sidewall when the vise is being transported and is otherwise not being used.

After the vehicle has been driven to the job site and it is desired to use the vise, the swivel column with the connected vise support arm and the vise can be rotated or swiveled relative to the base supported socket. In this manner, the vise can be rotated away from the truck sidewall to any one of a number of more accessible, conveniently located, work positions. Once the vise has been swiveled or rotated to the desired work position, the swivel column can be locked within the swivel socket to thereby maintain the vise in the desired, selected location.

It is therefore an object of the present invention to provide an improved swivel mount for a vise of the type set forth.

It is another object of the present invention to provide a novel swivel mount for a vise that is suitable for attaching directly to the bed of a truck or other vehicle and which is capable of being transported while locked in one position and which is adapted to be rotated to a more accessible position when it is intended to use the vise.

It is another object of the present invention to provide a novel swivel mount for a vise comprising a base securely bolted to a truck bed, an upwardly open swivel socket welded or otherwise affixed to the base, a swivel column rotatable within the swivel socket between any one of a number of circularly adjusted positions, a horizontal vise support arm affixed to the top of the swivel column, the vise support arm terminating outwardly in a vise support bed and a telescoping, movable support column affixed to the arm below the vise support bed to support the vise in any one of its circularly rotated work positions.

It is another object of the present invention to provide a novel swivel mount for a vise that is inexpensive in manufacture, sturdy in construction and trouble free when in use.

Other objects and a fuller understanding of the invention will be had by referring to the following description and claims of a preferred embodiment thereof, taken in conjunction with the accompanying drawings, wherein like reference characters refer to similar parts throughout the several views and in which:

BRIEF DESCRIPTION OF THE DRAWINGS

FIG. 2 is an exploded, perspective view of the vise swivel mount illustrated in FIG. 1.

FIG. 4 is a top plan view similar to FIG. 3, showing the swivel mount rotated to a third, work position.

FIG. 5 is a top plan view similar to FIG. 3 showing the swivel mount rotated to a fourth, work position.

DESCRIPTION OF THE PREFERRED EMBODIMENT OF THE INVENTION

Figure 1:
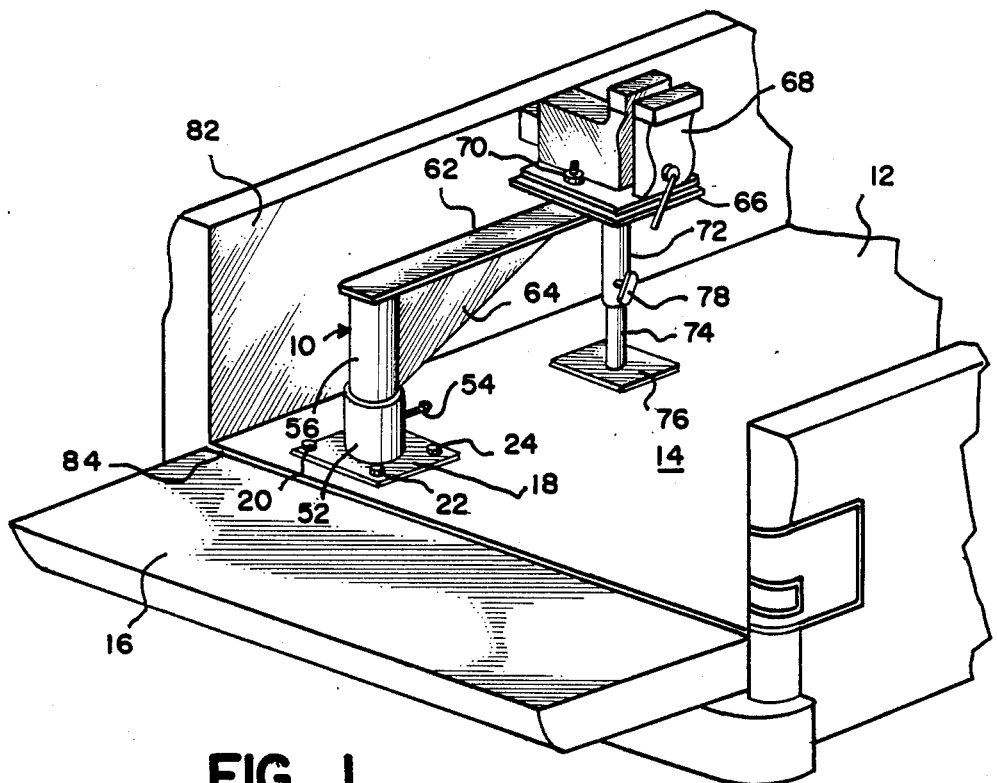
FIG. 1 is a perspective view showing the swivel mount of the present invention installed upon the bed of a truck in first or travel position.

Although specific terms are used in the following description for the sake of clarity, these terms are intended to refer only to the particular structure of the invention selected for illustration in the drawings, and are not intended to define or limit the scope of the invention.

Referring now to the drawings, as best seen in FIGS. 1 and 2, the swivel mount 10 for a vise 68 is intended for permanent installation upon the bed 14 of a worker's truck 12 so that the vise 68 can be readily available directly at a job site whenever required. As illustrated, the base 18 of the swivel mount preferably is affixed to the truck bed 14 adjacent to a sidewall 82 and near the rear terminus 84 of the truck bed 14. By mounting the base 18 in this position, the vise 68 can be conveniently rotated and stored immediately adjacent to or against the sidewall 82 of the truck when not in use and when the vehicle is being moved to thereby be positioned in an unobtrusive location. This will then leave the remainder of the truck available for other uses, for example, the storage and transportation of various tools and supplies. When the vise is to be used, after providing the required clearance, the vise can be rotated or swiveled about the base 18 to a desired circularly adjusted location.

The base 18 of the swivel mount 10 is provided with a plurality of openings 20, 22, 24 to receive the base mounting bolts 26, 28, 30, 32 therethrough. In a preferred construction, a base mounting plate 34 is positioned below the bottom surface of the truck bed 14 and is provided with a plurality of bolt receiving openings 36, 38, 40, 42. Accordingly, by placing the base 18 upon the truck bed 14, the base openings 20, 22, 24 can be utilized as a template to drill holes directly through the truck bed construction. The parts can then be secured together both above and below the truck bed by employing conventional base mounting bolts 26, 28, 30, 32 and securing nuts 44, 46, 48, 50.

A hollow, cylindrical swivel socket 52 is welded or otherwise securely affixed to the base 18 in a manner to project its open upper end 88 vertically upwardly. A spring pin 54 is provided in a suitable opening formed in the swivel socket sidewall 86 whereby the pin can enter the hollow interior of the swivel socket 52 for securing the swivel column 56 in a circularly adjusted position in the manner hereinafter more fully set forth.

A tubular swivel column 56 rotatively positions within the hollow interior of the swivel socket 52 and is provided with a plurality of circularly spaced locking openings 58, 60 in vertical alignment with the spring pin 54. Accordingly, by inserting the swivel column downwardly through the open end 88 of the swivel socket 52, the plurality of locking openings 58, 60 can be brought into vertical alignment with the spring pin 54. Then, by pulling the spring pin 54 outwardly and turning the swivel column 56 relative to the swivel socket 52, any one of the adjustment or locking openings 58, 60 can be brought into alignment with the spring pin 54. When the desired adjustment opening 56, 58 is rotated into alignment with the spring pin 54, the spring can be released to allow the pin to enter the selected locking opening 58, 60 to thereby lock the swivel column 56 in a desired circularly rotated location within the swivel socket 54.

A horizontal vise support arm 62 is welded or otherwise secured to the top of the swivel column 56 whereby the swivel column and the vise support arm will be rotated as a unit when it is desired to circularly rotate the vise 68. If desired, a reinforcing strut 64 may be secured between the outer periphery of the swivel column 56 and the underside of the vise support arm 62 for reinforcing purposes in known manner. A vise mounting bed or plate 66 is endwardly affixed to the vise support arm 62 and is provided with suitable openings to receive the vise clamping bolts 70 therethrough to rigidly secure the vise 68 to the vise support arm 62. A telescoping support column 72 comprising a movable, telescoping lower member 74 and bottomly affixed column support plate 76 is affixed to the underside of the vise support arm 62 immediately beneath the vise 68 for vise support purposes. An adjustment or locking handle 78 is movable through an adjustment opening 80 provided in the stationary arm of the support column 72 to permit vertical adjustment of the column support base as may be necessary to accommodate differences in elevation between the truck bed 14 and the truck tailgate 16 or other constructions utilized to support the vise 68.

Figure 3:
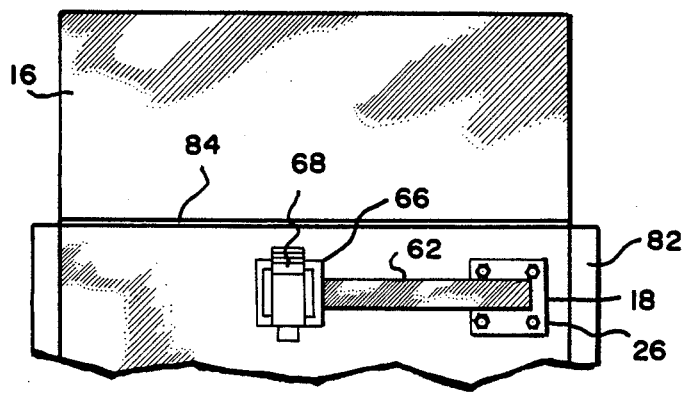
FIG. 3 is a partial, top plan view on reduced scale showing the swivel mount rotated to a second, work position.

Still referring to FIG. 1, and further considering FIGS. 3, 4 and 5, when it is desired to transport the vise 68 to the job site, the spring pin 54 can be pulled outwardly until the pin clears the adjustment openings 58, 60 provided in the swivel column 56. With the column thus freed, the vise 68 can be rotated about the swivel socket 52 to the desired circularly rotated location, immediately adjacent to the truck sidewall. Upon arrival at the job site, the vise can be rotated to any one of a number of circularly rotated positions. For example, as illustrated in FIG. 3, the vise 68 can be positioned centrally of the truck 12 near the rear end 84 of the truck bed 14. By rotating the vise, the attached vise support arm 68 and the swivel column 56 as a unit while pulling the spring pin, one of the locking or adjustment openings 58, 60 can be brought into alignment with the spring pin 54. The spring pin can then be released to enter the aligned adjustment opening 58, 60 to thereby lock the swivel column 56 and the attached vise support arm 62 and vise 68 in the work position illustrated in FIG. 3.

Similarly, if it is desired to position and lock the vise 68 outwardly of the truck bed 14, the spring pin 54 can be pulled outwardly until the vise support arm 62, the vise 68 and the telescoping support column 72 are angularly located and positioned upon the truck tailgate 16 in the manner illustrated in FIG. 4. One of the adjustment openings 58, 60 can be brought into alignment with the spring pin 54 whereby release of the spring pin will secure the swivel column 56 in this circularly adjusted position. The vise 68 can also be similarly located near the outward end of the truck tailgate 16, if so desired, upon further rotation of the swivel column 56 and vise support arm 62 relative to the swivel socket to the position illustrated in FIG. 5. Again, the spring pin 54 can be pulled outwardly until one of the adjustment openings 58, 60 aligns with the spring pin to secure the parts in this circularly adjusted position. As hereinbefore set forth, the telescoping column 72 can be vertically adjusted as necessary to provide firm vertical support for the vise 68 in any of its circularly adjusted positions.

Although the invention has been described with a certain degree of particularity, it is understood that the present disclosure has been made only by way of example and that numerous changes in the details of construction and the combination and arrangement of parts may be resorted to without departing from the spirit and scope of the invention. Thus, the scope of the invention should not be limited by the foregoing specification, but rather, only by the scope of the claims appended hereto.

What is claimed is:

1. In combination a vise swivel mount, mounting a vise on a movable truck of the type having a bed and a sidewall comprising:
   a base secured to the movable truck bed, the base comprising an upwardly open swivel socket;
   a vise support rotatively secured within the swivel socket, the vise support comprising a swivel column within the swivel socket and a vise support arm affixed to the swivel column, the vise support arm and the swivel column being adapted to rotate as a unit relative to the swivel socket, the vise support arm being rotatable from a first position immediately adjacent to the truck sidewall to a second position that is rotatively spaced from the truck sidewall, the vise support arm carrying a vise support pad; and
   a support column affixed to the vise support arm beneath the vise support pad in spaced relationship to the vise support, the vise support column extending from the vise support pad to the movable truck bed, the vise support column being rotatable about the vise support when the vise support arm is moved between the said first and second positions;
   whereby a vise secured to the vise support pad can be rotated relative to the movable truck bed between any one of a number of circularly adjusted position and wherein the vise can be easily transported from jot site to job site by utilizing the truck.

2. The vise swivel mount of claim 1 and means to lock the circularly adjusted position of the swivel column relative to the swivel socket in either the first position or the second position.

3. The vise swivel mount of claim 2 wherein said means to lock comprises a movable pin secured in the swivel socket and a plurality of circularly spaced openings provided in the swivel column whereby the insertion of the pin into one of the circularly spaced opening locks the rotative position of the swivel column relative to the swivel socket.

4. The vise swivel mount of claim 3 wherein the pin is provided with a spring to normally bias the pin toward locking engagement within one of the circularly spaced openings.

5. The vise swivel mount of claim 1 wherein the vise support column comprises a first column support and a second column support, the second column support being in telescoping arrangement with the first telescoping support, the vise support column being parallel to the truck sidewall and being vertically oriented.

6. The vise swivel mount of claim 5 wherein the vise support column comprises a flat support pad affixed to the bottom of the second column support, the flat pad being in contact with a first portion of the movable truck bed when the vise support arm is in the first position and being in contact with a second portion of the movable truck bed when the vise support arm is in its said second position.

7. The vise swivel mount of claim 6 and an adjustment handle secured in the first column support, the adjustment handle being adapted to contact the second column support to lock the column members in any desired vertically longitudinal adjusted position.

8. The vise swivel mount of claim 1 wherein the base is provided with a plurality of openings therethrough and mounting bolts positioned through the openings to secure the base to the movable truck bed.

9. The vise swivel mount of claim 8 and a bottom base mounting plate, the bottom base mounting plate being positioned below the movable truck bed, the bottom base mounting plate being provided with a plurality of openings to receive the said mounting bolts therethrough whereby the swivel socket can be secured to the movable truck bed both from above and from below the movable truck bed.

10. The vise swivel mount of claim 1 wherein the truck comprises a tailgate extending rearwardly from the bed and wherein the vise support column contacts the said tailgate when the vise support arm is rotated to its said second position.

* * * * *